Jan. 4, 1966     B. D. MORGAN     3,227,604
NON-SKID TREAD
Filed April 24, 1961
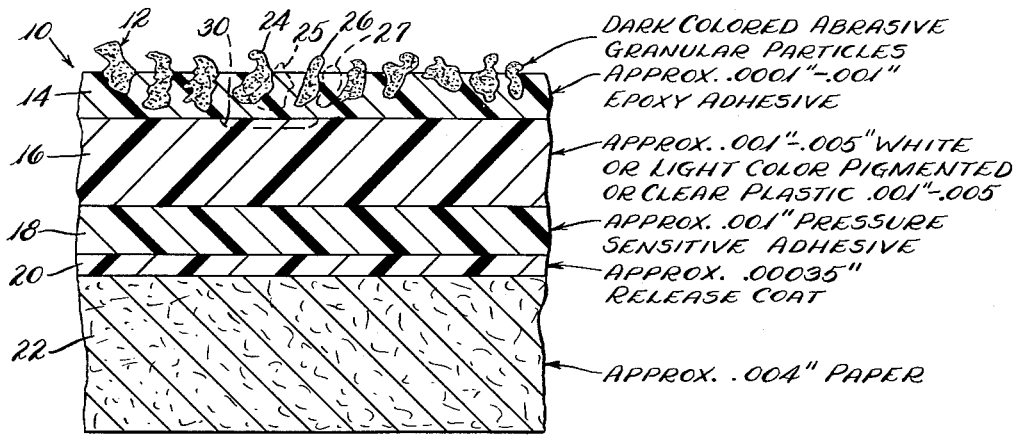
INVENTOR.
BURTON D. MORGAN
BY
ATTYS.

3,227,604
NON-SKID TREAD
Burton D. Morgan, Hudson, Ohio, assignor to Morgan Adhesives Company, Stow, Ohio, a corporation of Ohio
Filed Apr. 24, 1961, Ser. No. 105,213
3 Claims. (Cl. 161—162)

This invention relates to a flexible laminate of the polyvinyl chloride type or the like having an abrasive or non-skid surface which is backed by a layer of pressure sensitive adhesive and more particularly, relates to an abrasive laminate surface of outstanding artistic appearance which minimizes any disclosure of dirt, scuff markings and wear by the provision of black abrasive particles against a background either of a sharply contrasting white enamel-like plastic surface or against a clear plastic translucent enamel appearing surface having exceptional non-discoloration characteristics.

One object of the invention is the provision of an extremely artful, clean appearing, curl-proof, shrinkage free, flexible, exceedingly thin, translucent, and peel-off paper protected pressure sensitive adhesive-backed abrasive laminate that is trip-free and skid-proof for highly wear-resistant service, without loss of abrasive particles, and as applied to severe, hard and wet or dry usage, such as may be encountered when employed on wood, composition, metal or marble and the like surfaces for indoor or outdoor horizontal flooring, ramps and steps.

The foregoing objects and other objects which will become apparent as the description proceeds, are achieved by the provision of a curl-free flexible adhesive-backed and extremely thin abrasive laminate, having a very highly artful, clean appearing abrasive surface of exceptional wear-resistance and comprising, a white or very light pigmented or clear polyvinyl chloride plastic film, dark abrasive particles of silicon carbide or garnet and the like of sizes selected within a range such as will pass a twelve mesh screen but not pass a five hundred mesh screen, a film of thermosetting epoxy adhesive secured to the upper face of the plastic, and with the abrasive particles partly embedded therein as distributed in random manner to cover more than about twenty-five percent but less than about seventy-five percent of the epoxy adhesive surface and with about from twenty-five percent to fifty percent of the surface areas of the particles extending above the epoxy adhesive surface, the epoxy adhesive film providing a resilient and yielding wear-resistant carrier for permanent bonding of the abrasive particles and of the epoxy adhesive to the surface of the plastic film and which epoxy adhesive may be pigmented to a very light or white color or clear, a layer of pressure sensitive adhesive secured to the underside of the plastic surface, a layer of release material incompatible with the adhesive layer applied to the underside of the pressure sensitive adhesive layer, and a layer of paper or metal foil applied to the underside of the release material.

For a better understanding of the invention reference should be had to the accompanying drawing of a very greatly enlarged fragmentary cross-sectional view through a skid-proof and abrasive laminate incorporating the principles of the invention. This preferred form of the invention, as shown, discloses a very thin laminate of flexible sheet-like construction 10, with an overall thickness of the laminate proper of usually between about .0054 inch and about .0113 inch, although not limited to such dimensions. The abrasive particles 12 are partly embedded in and bonded to the resilient, smooth and hard surface film of epoxy adhesive 14. The particles in general extend above the surface by from about twenty-five to about fifty percent of their volume in order to provide the desired abrasive or frictional resistance functions. To provide a particularly important, very highly artful and clean-appearing surface, which minimizes any disclosure of a dirty and scuff-marked or worn surface, the surface is of pigmented white or light color, or of a clear, translucent color that presents an enamel-like appearance upon which black or dark-colored abrasive particles are bonded and distributed in a random manner, as to cover more than about twenty-five percent, but less than about seventy-five percent of each cubic inch of the surface area. The black or dark-colored granular abrasive particles are of silicon carbide or garnet, though not limited thereto, and the particle size limits may be selected from a wide range such as wherein they would pass through a twelve mesh screen, but not pass through a five hundred mesh screen.

The surface film of epoxy adhesive 14 in which the granules 12 are thermoset may for example be of a thickness between .0001 inch and .001 inch. This thin resilient coating may be pigmented for a white or very light color but preferably is of the clear type and is affixed by the thermoset to the upper surface of the polyvinyl chloride plastic film 16. Film 16 has a thickness of, for example, between about .001 inch and .005 inch. This plastic film, preferably is pigmented to a white or very light color, or is of a clear translucent type and in combination with the epoxy adhesive film 14 the outer surface of the entire abrasive lamination assumes an attractive lustre or enamel-like appearance as considered in combination with the block abrasive granules.

To the lower surface of the plastic film 16 is secured a layer of pressure sensitive adhesive 18, this usually being a rubber and resin combination and applied in a thickness of, for example, about .001 inch.

Secured to the underside of the adhesive layer 18 is a layer 20 of a release coat incompatible with the adhesive layer 18 and typically comprising a polymerized silicone of a thickness, for example, of about .00035 inch.

Affixed to the underside of the release coat 20 is a layer 22 of paper of a thickness of about .004 inch. The paper film is commonly recognized by customers as the portion of the laminate to be peeled off in order to expose the pressure sensitive adhesive and for convenient application of the abrasive laminate to its intended use. By reason of the stiffness and thickness of the paper it also enables the customer to readily initiate the peeling off operation.

The fine abrasive particles are so embedded and bonded to the thermoset epoxy adhesive that when the particles and surface are scuffed, scraped or receive a blow, the adhesive serves as a thin, flexible, yielding and wear-resistant carrier. With granules 24 and 26 shown in normal position, such action will compress these bonded particles and the thermoset epoxy adhesive whereupon the particles assume the positions 25 and 27 respectively, as shown partly in dotted outline and the resilient thermoset adhesive film also yieldingly serves to compress the plastic film 16 as shown in dotted outline form at 30. The resilient action on the part of the surface to which the fine abrasive particles are bonded and of the plastic 16 serves to prevent the escape of the particles from the surface while increasing the wear-resistant and efficient non-skid and abrasive properties of the laminate.

It will be understood that this preferred form of the invention employing an extremely thin, flexible, abrasive laminate may be applied to great advantage as a most attractive and very wear-resistant material having for example, outstanding non-skid and non-trip properties. However, the invention is not otherwise limited to the dimensional thickness as described.

Further, the invention importantly involves an abrasive laminate surface that is either of a very light color, including a white enamel-like background dotted with the fine highly contrasting black abrasive particles, wherein a somewhat salt and pepper-like pattern is produced and in which case the dark grip upon the light background operates to minimize any appearance of dirt, scuffing and wear of the laminate, or may be of a clear, translucent and enamel-like background which in combination with the black, fine, abrasive granules is productive of an appearance having peculiarly attractive and non-discoloring characteristics. In any event each of the very attractive abrasive laminate surfaces importantly minimize any appearance of dirt, or scuffing and wear throughout a long serviceable life of very severe, hard usage for which the laminate of the invention is constructed.

It will be understood that the laminate of the invention may be conveniently applied to any contemplated use by employing the efficient pressure sensitive adhesive upon removal of the paper peel-off backing. The abrasive laminate may be employed for many purposes including, but not by way of limitation, as a non-skid and non-trip, abrasive retaining material for showers, bathtubs, pleasure boats, office buildings and homes. The application to wood, metal or marble and the like surfaces, such as steps, flooring or ramps are among the important uses for the abrasive laminate of the invention.

While in accord with the patent statutes at least one specific embodiment of the invention has been described in detail, it is to be particularly understood that the invention is not to be limited thereto or thereby, but that its scope is defined by the appended claims.

I claim:

1. A resilient non-skid abrasive laminate tread including in combination a resilient polyvinyl chloride plastic film, a resilient layer of epoxy adhesive material on the upper surface of the plastic film, a plurality of dark colored abrasive granules partly embedded in the epoxy film but spaced from the plastic film, said laminate tread being less than about .005 inch in thickness.

2. A non-skid tread laminate including in combination a compressible plastic film, a layer of compressible epoxy film on one surface of the plastic film, a plurality of granular abrasive particles randomly distributed over the epoxy film and partly embedded therein, the epoxy film in combination with the plastic film providing a resilient mounting of the particles, a pressure sensitive adhesive means applied to the other surface of the plastic film, paper protective means covering the adhesive means, and release means between the protective means and the adhesive means.

3. A thin flexible non-skid tread including in combination a compressible light-colored polyvinyl chloride plastic film between .001 to .005 inch in thickness, a layer of compressible light-colored epoxy film between .0001 to .001 inch in thickness attached to the upper surface of the plastic film, a plurality of dark-colored granular abrasive particles randomly distributed over the epoxy film and between about 50 and about 75 percent embedded therein, the particles covering between twenty-five to seventy-five percent of the surface area, the particles being of sizes selected within a range as to pass a 12 mesh screen, but not to pass a 500 mesh screen, the epoxy film in combination with the plastic film providing a resilient mounting of the particles allowing tilting movement thereof, a pressure sensitive adhesive layer between .005 and .0015 inch in thickness affixed to the under surface of the plastic film, paper protective means covering the adhesive layer, and release means between the protective means and the adhesive layer, the total thickness of the tread being between about .005 and about .0113 inch.

References Cited by the Examiner
UNITED STATES PATENTS

| | | | |
|---|---|---|---|
| 2,339,500 | 6/1944 | Martin | 51—297 |
| 2,667,436 | 6/1954 | Goeppert et al. | 117—33 |
| 2,706,936 | 4/1955 | Wilson | 94—5 |
| 2,732,065 | 1/1956 | Marchese | 154—53.5 |
| 2,824,851 | 2/1958 | Hall | 51—298 |
| 2,880,080 | 3/1959 | Rankin et al. | 51—297 |
| 2,948,201 | 8/1960 | Nagin et al. | 94—5 |
| 2,996,150 | 8/1961 | Cassem | 238—14 |
| 3,014,795 | 12/1961 | Schmidlin | 51—297 |
| 3,030,251 | 4/1962 | LaBore et al. | 154—53.5 |
| 3,136,614 | 6/1964 | Kuzmick | 51—297 |

ALEXANDER WYMAN, *Primary Examiner.*

EARL M. BERGERT, *Examiner.*

R. J. ROCHE, *Assistant Examiner.*